Patented Oct. 4, 1927.

1,644,246

UNITED STATES PATENT OFFICE.

ALPHONS GAMS AND MAX GIRARD, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF CALCIUM SALTS OF INOSITOL-PHOSPHORIC ACID.

No Drawing. Original application filed April 9, 1923, Serial No. 630,913, and in Great Britain March 29, 1923. Divided and this application filed December 1, 1925. Serial No. 72,580.

The present application, which is a division of our application Serial No. 630,913, filed April 9, 1923, relates to a process for the manufacture of calcium salts of inositol-phosphoric acid and comprises the process of making these calcium salts of inositol-phosphoric acid.

It is known that alkali metal salts of inositol-phosphoric acid may be obtained by treatment of the iron salt of this acid with alkali metal hydroxide. The iron salt of inositol-phosphoric acid itself had to be prepared from other salt mixtures of inositol-phosphoric acid, e. g. from a raw mixture of the calcium or magnesium salt by precipitating their solutions with an iron compound, e. g. iron chloride.

It is further known that alkali metal salts of inositol-phosphoric acid may be transformed, by double decomposition with calcium compounds, into saturated calcium salts of inositol-phosphoric acid of the formula

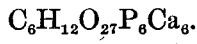

$$C_6H_{12}O_{27}P_6Ca_6.$$

From these the acid calcium salts of inositol-phosphoric acid could be obtained according to a known method by addition of acid and precipitation by means of alcohol.

By a saturated salt of inositol phosphoric acid a compound is understood wherein all the twelve hydrogen atoms of the phosphoric acid groups are replaced by a metal or an equivalent radical, for instance Ca, Mg, Na, $NH_4$, and the like.

We have found, that alkali metal salts of inositol-phosphoric acide may also be obtained directly from the magnesium salts of this acid by treating them with an alkali metal hydroxide.

By the rational combination of this new process of preparing the alkali metal salts of inositol-phosphoric acid with the aforesaid method of transforming an alkali metal salt of inositol-phosphoric into a calcium salt of this acid, it is possible to obtain acid calcium salts of inositol-phosphoric acid through the alkali metal salts by a simplified method, i. e. by avoiding the passage through the iron salt of the inositol-phosphoric acid, and, if desired, also the passage through the saturated calcium salts.

One may e. g. proceed as follows:

A saturated or acid magnesium salt of inositol-phosphoric acid is boiled with an alkali metal hydroxide solution, whereby the saturated alkali metal salt of inositol-phosphoric acid, containing 12 atoms of alkali metal, is formed. The solution of the latter is mixed with somewhat more of a suitable acid than is necessary to form the acid alkali metal salt of inositol-phosphoric acid. To this solution there is added a quantity of a soluble calcium compound necessary for forming the acid calcium compound of inositol-phosphoric acid, and the solution of the acid calcium salt of inositol-phosphoric is precipitated by means of alcohol.

Instead of converting the alkali metal salt of inositol-phosphoric acid directly into its acid calcium salt one may also first precipitate the saturated calcium salt of inositol-phosphoric acid from the solution of the alkali metal salt by means of a calcium compound, whereupon this insoluble calcium salt is dissolved in somewhat more of a suitable acid than is necessary for the formation of the acid calcium salt, and the solution thus obtained precipitated with alcohol.

When desired, the saturated alkali metal salt obtained by the reaction with magnesium salt may be isolated previous to its conversion into the calcium salt by precipitation with alcohol or by crystallization. Before isolation, the saturated alkali metal salt may be neutralized partially; the isolated alkali metal salt is then dissolved in water and further worked up to the soluble acid calcium salt, in the manner already described.

It will be obvious that the ambit of this invention is not limited to the reactions described above and particularly detailed in the examples. The invention covers all forms of the process which, starting from any magnesium or alkali metal salt, use, on the one hand, the double decomposition of a magnesium salt to an alkali metal salt and of an alkali metal salt to a calcium salt, and on the other hand, the acohol precipitation producing directly or indirectly an acid calcium salt of inositol-phosphoric acid. The following examples illustrate the invention.

*Example 1.*

5 kilos of crude insoluble magnesium salt of inositol-phosphoric acid are suspended in about 20 litres of water. The suspension is mixed with caustic soda solution until permanently alkaline to phenolphthalein, and then heated. If by this treatment the alkaline reaction to phenolphthalein has disappeared, some more alkali is added; the whole is then allowed to cool and filtered. The filtrate containing the saturated sodium salt of inositol-phosphoric acid may either directly or after isolation be converted into the calcium salt of inositol-phosphoric acid as will be described in the next examples.

*Example 2.*

The solution of 1 kilo of the saturated sodium salt of inositol-phosphoric acid in 4-5 litres of water, as it may e. g. be obtained according to Example 1, is mixed with hydrochloric acid until acid to Congo. This solution is mixed with 800 cc. of calcium chloride solution of 25 per cent. strength, and 1-2 times its volume of alcohol is added to produce a precipitate which is washed and dried. The pure white water-soluble powder thus obtained contains when dry 22.07 per cent. of phosphorus and 13.78 per cent. of calcium.

*Example 3.*

The aqueous filtrate of the saturated sodium salt of inositol-phosphoric acid, obtained according to example 1, is mixed with calcium chloride solution or milk of lime until no more precipitate is produced. The precipitate is filter-pressed, well washed with water, suspended in water, and dissolved by addition of hydrochloric acid until acidity to Congo is indicated. The addition of alcohol to this solution produces a precipitate which is well washed and dried in a vacuum. The pure white water-soluble powder thus obtained contains 21.61 per cent. of phosphorus and 13.48 per cent. of calcium.

*Example 4.*

The solution of the saturated sodium salt of inositol-phosphoric acid, obtained as described in Example 1, is neutralized with hydrochloric acid or acetic acid, mixed with alcohol, and the precipitate thus obtained is dried in a vacuum. It forms a white hygroscopic powder very easily soluble in water and is the neutral sodium salt of inositol-phosphoric acid. This compound may be converted into the acid calcium salt of inositol-phosphoric acid in the manner described in Example 2 or 3.

*Example 5.*

The aqueous solution of the saturated sodium salt of inositol-phosphoric acid obtained as described in Example 1 is mixed with alcohol, the precipitate is filtered with pressure, washed with alcohol, and dried. It constitutes the saturated sodium salt containing water of crystallization. It dissolves in water to a liquid having alkaline reaction to phenolphthalein.

In converting this salt into the acid calcium salt, the method of Example 2 or 3 may be used.

*Example 6.*

The solution of the saturated sodium salt of inositol-phosphoric acid, obtained as described in Example 1, is concentrated on the water bath until a sample shows a crystalline separation after standing in the cold. This crystalline product is then recrystallized in the cold, whereby white colourless crystals are obtained, which are easily soluble in water to a solution having alkaline reaction. By further concentration of the mother liquor, or by precipitation with alcohol, an additional quantity of the sodium salt containing water of crystallization can be obtained.

The salt thus obtained may be converted into the acid calcium salt according to Example 2 or 3.

What we claim is:

1. The herein described manufacture of calcium salts of inositol-phosphoric acid consisting in treating compounds of inositol-phosphoric acid of the formula $$C_6H_{12}O_{27}P_6X$$

(wherein the 12 hydrogen atoms represented by X are substituted wholly or partially by magnesium) with alkali metal hydroxides and converting the alkali metal salts of inositol-phosphoric acid thus obtained with calcium compounds of sufficient solubility in the medium wherein the reaction is effected, and whose anion yields with sodium a salt soluble in dilute alcohol.

2. The herein described manufacture of acid calcium salts of inositol-phosphoric acid, consisting in treating compounds of inositol-phosphoric acid of the formula $$C_6H_{12}O_{27}P_6X$$

(wherein the 12 hydrogen atoms represented by X are substituted wholly or partially by magnesium) with alkali metal hydroxides and converting the alkali metal salts of inositol-phosphoric acid thus obtained under acid conditions with calcium compounds soluble in the reaction medium, whose anion yields with sodium a salt soluble in dilute alcohol.

3. The herein described manufacture of acid calcium salts of inositol-phosphoric acid, consisting in treating compounds of inositol-phosphoric acid of the formula $$C_6H_{12}O_{27}P_6X$$

(wherein the 12 hydrogen atoms represented by X are substituted wholly or partially by magnesium) with alkali metal hydroxides, filtering the mixture, mixing the filtrate with somewhat more of an acid, yielding with the alkali metal a salt soluble in dilute alcohol, than is necessary to form the acid sodium salt of inositol phosphoric acid, adding a calcium compound, soluble in the reaction medium, whose anion yields with sodium a salt soluble in dilute alcohol, and precipitating the solution of the acid calcium salt of inositol-phosphoric acid thus obtained with alcohol.

4. The herein described manufacture of acid calcium salts of inositol-phosphoric acid, consisting in treating compounds of inositol-phosphoric acid of the formula $$C_6H_{12}O_{27}P_6X$$

(wherein the 12 hydrogen atoms represented by X are substituted wholly or partially by magnesium) with caustic soda solution, filtering the mixture, mixing the filtrate containing the saturated sodium salt of inositol-phosphoric acid with somewhat more of an acid yielding with the alkali metal a salt soluble in dilute alcohol, than is necessary to form the acid sodium salt of the inositol-phosphoric acid, adding to this solution a calcium compound, soluble in the reaction medium, whose anion yields with sodium a salt soluble in dilute alcohol, employing a quantity of the calcium compound equivalent to the acid sodium salt of the inositol-phosphoric acid present, and precipitating the solution of the acid calcium salt of the inositol-phosphoric acid thus obtained with alcohol.

5. The herein described manufacture of acid calcium salts of inositol-phosphoric acid, consisting in treating compounds of inositol-phosphoric acid of the formula $$C_6H_{12}O_{27}P_6X$$

(wherein the 12 hydrogen atoms represented by X are substituted wholly or partially by magnesium) with caustic soda solution at temperatures up to the boiling point of the latter, filtering the mixture, mixing the filtrate containing the saturated sodium salt of inositol-phosphoric acid with somewhat more of an acid, yielding with the alkali metal a salt soluble in dilute alcohol, than is necessary to form the acid sodium salt of the inositol-phosphoric acid, adding to this solution a calcium compound, soluble in the reaction medium, whose anion yields with sodium a salt soluble in dilute alcohol, employing a quantity of the calcium compound equivalent to the acid sodium salt of the inositol-phosphoric acid present, and precipitating the solution of the acid calcium salt of inositol-phosphoric acid thus obtained with alcohol.

6. In the manufacture of acid calcium salts of inositol-phosphoric acid from its magnesium salts, the step of converting the magnesium salts of inositol-phosphoric acid into its saturated alkali metal salts by direct conversion with alkali metal hydroxides.

In witness whereof we have hereunto signed our names this 19th day of November 1925.

ALPHONS GAMS.
MAX GIRARD.